United States Patent Office 2,982,768
Patented May 2, 1961

2,982,768
16β-LOWER ALKYL PREGNANE DERIVATIVES

David Taub, Metuchen, Norman L. Wendler, Summit, and Robert D. Hoffsommer, Jr., Metuchen, N.J., assignors to Merck & Co., Inc., Rahway, N.J., a corporation of New Jersey No Drawing. Filed July 15, 1958, Ser. No. 748,614

4 Claims. (Cl. 260—239.55)

This invention is concerned generally with novel steroid compounds and with processes of preparing the same, more particularly, it relates to 16β-alkyl-11-oxygenated steroids of the pregnane series. It relates also to novel processes for producing 16β-alkyl steroids.

The 16β-alkyl-steroids produced in accordance with the present invention are useful intermediates which can be converted to 16β-alkylcortical steroids which possess extremely high anti-inflammatory activity, considerably greater than that of the parent cortical steroids, and are especially effective for the treatment of arthritis and related diseases since they can be administered for their cortisone-like action in extremely low dosage thereby minimizing undesired side effects. The activity of 16 beta-alkyl steroids is especially novel as all previous group substitution modifications of cortical steroids which have resulted in increased anti-inflammatory activity have involved introduction of alpha-substituents.

In preparing our novel chemical compounds, the starting material utilized may be a 16-alkyl-3-substituted-11-oxygenated-16-pregnene-20-one or a 16-alkyl-3-substituted-11-oxygenated-16-allopregnene-20-one which may be identified by the following structural formula—

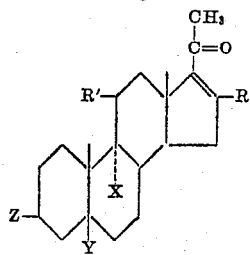

wherein X is hydrogen or halogen, Y is alpha or beta hydrogen, Z is oxygen, dioxolane, alpha or beta acyloxy or hydroxy, R is alkyl and R' is hydroxy or oxygen, with or without a double bond in the 5(6)-position.

The above Δ¹⁶-16-alkyl starting materials of the present invention, namely, 16-alkyl-3-substituted-11-oxygenated-16-pregnene-20-ones or 16-alkyl-3-substituted-11-oxygenated-16-allopregnene-20-ones can be prepared by reacting the corresponding 16-pregnenes or 16-allopregnenes with diazoalkanes such as diazomethane, diazoethane, diazopropane, or diazobutane, etc., to form the corresponding 3-substituted-11-oxygenated-16α,17α-alkylene-azopregnane-20-ones or 3-substituted-11-oxygenated-azo-allopregnane-20-ones represented by the following:

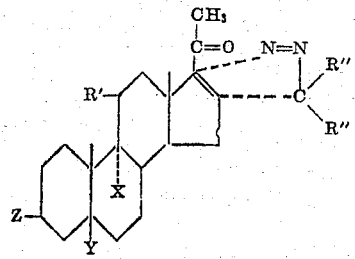

wherein R', X, Y and Z are as above and R'' is hydrogen or alkyl with or without a double bond at the 5(6)-position.

Upon heating these products nitrogen is evolved and there is formed primarily the corresponding 16-alkyl-3-substituted-11-oxygenated-16-pregnene-20-ones or 16-alkyl - 3 - substituted-11-oxygenated-16-allopregnene-20-ones which are starting materials for the present process and which may be represented by the following formula—

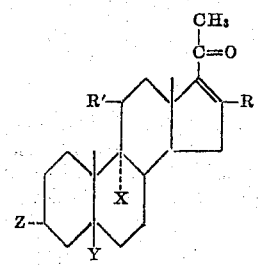

wherein R and R', X, Y and Z are as above with or without a double bond at the 5(6)-position.

In a preferred embodiment of our invention, 3α-acetoxy-16β-methyl-16-pregnene-11,20-dione which is represented by the following formula—

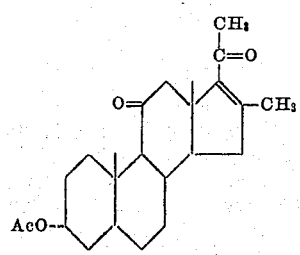

is utilized as the starting material. However, it is clear to those skilled in the art that other starting materials such as those described above, may be similarly converted to the desired products.

It has been found that the 3α-acyloxy-16β-alkyl-16-pregnene-11,20-dione can be hydrogenated in the presence of an hydrogenation catalyst, such as palladium on calcium carbonate to form 3α-acyloxy-16β-alkylpregnane-11,20-dione which may be indicated graphically as follows:

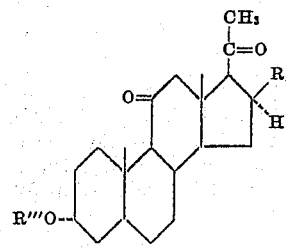

wherein R is alkyl, and R''' is acyl.

Hydrolysis of the 3α-acyloxy-16β-alkylpregnane-11,20-dione with methanolic potassium bicarbonate results in the formation of 16β-alkyl-3α-hydroxypregnane-11,20-dione which has the following structural formula—

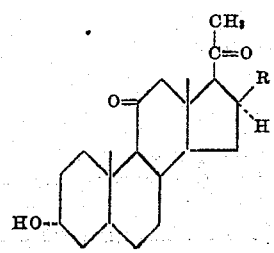

Either the 3α-acyloxy-16β-alkylpregnane-11,20-dione or the 16β-alkyl-3α-hydroxypregnane-11,20-dione can be reacted with sodium hydroxide to form 16β-alkyl-3α-hydroxy-17-isopregnane-11,20-dione which has the formula—

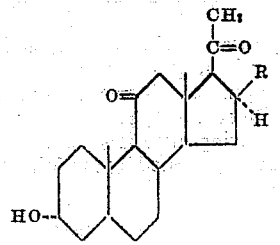

wherein R is as above.

Treatment of the 16β-alkyl-3α-hydroxy-17-isopregnane-11,20-dione obtained above with an acylating agent such as an acyl anhydride results in the formation of 3α-acyloxy-16β-alkyl-17-isopregnane-11,20-dione which may be represented as follows—

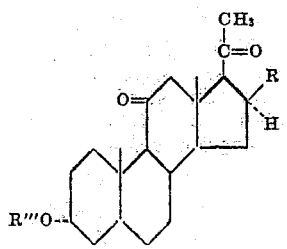

The 16β-alkyl-3α-hydroxypregnane-11,20-dione or the corresponding 3α-acylate as well as the 16β-alkyl-3α-hydroxy-17-isopregnane-11,20-dione or its corresponding acylate obtained above can be reacted with an acyl anhydride and an acid catalyst such as perchloric acid to form 3α,20-diacyloxy-16β-alkyl-17(20)-pregnene-11-one which has the following formula—

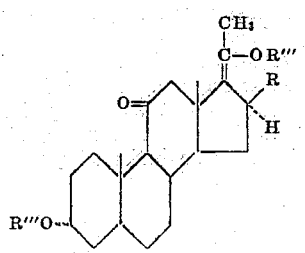

wherein R and R''' are as above.

Treatment of the 3α-diacyloxy-16β-alkyl-17(20)-pregnene-11-one with an organic peracid such as perbenzoic acid yields 3α,20-diacyloxy-16β-alkyl-17(20)-oxidopregnene-11-one which may be represented as follows—

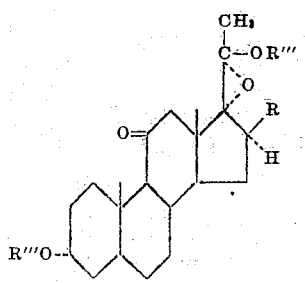

wherein R and R''' are as above.

Upon reaction of the 3α,20-diacyloxy-16β-alkyl-17(20)-oxido-pregnane-11-one with an alkali metal hydroxide such as sodium hydroxide there is formed 16β-alkyl-3α, 17α-dihydroxypregnane-11,20,dione which may be represented as follows:

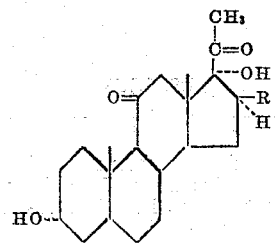

wherein R is as above.

This latter compound, namely, 16β-alkyl-3α,17α-dihydroxypregnane-11,20-dione produced by our novel process can be readily converted to 16β-methyl cortical steroids which possess effective anti-inflammatory activity. As an illustration of one such procedure, 16β-alkyl-3α, 17α-dihydroxypregnane-11,20-dione can be brominated to form 16α-alkyl-21-bromo-3α,17α-dihydroxypregnane-11, 20-dione. The latter compound then can be reacted with an acylating agent to form 16β-alkyl-3α,17α,21-trihydroxy-pregnane-11,20-dione 21-acylate, reaction of the latter compound with an oxidizing agent such as N-bromosuccinimide or chromic acid results in the formation of 16β-alkyl-17α,21-dihydroxypregnane-3,11,20 - trione 21 - acylate. Upon bromination of the latter compound there is formed 16β-alkyl-4-bromo-17α,21-dihydroxypregnane-3,11,20-trione 21-acylate. The latter compound is reacted with semicarbazide hydrochloride to form the 3-semicarbazone of 16β-alkyl-17α,21-dihydroxy-4-pregnene-3,11,20-trione 21-acylate. This latter compound is then reacted with pyruvic acid in aqueous acetic acid to form 16β-alkyl-17α,21-dihydroxy-4-pregnene-3,11,20-trione 21-acylate. This latter compound may also be named 16β-alkyl cortisone acylate, and possesses effective anti-inflammatory activity.

The following examples are to be understood as illustrative only and are in no way to be construed as limiting the invention.

EXAMPLE 1

*Preparation of 3α-acetoxy-16β-methylpregnane-11,20-dione*

To a solution of 200 mg. of 3α-acetoxy-16-methyl-16-pregnene-11,20-dione (prepared as described hereinbelow) in 20 ml. of methanol was added 200 mg. of 25% palladium on calcium carbonate catalyst. The mixture was stirred in hydrogen (1 atm. pressure; 25° C.) until hydrogen uptake was complete. The mixture was filtered, the filtrate was taken to dryness and the residue crystallized from ether-hexane to give pure 3α-acetoxy-16β-methylpregnane-11,20-dione as needles M.P. 160–162° C.;

$\lambda_{max.}^{CHCl_3}$ 5.80, 5.85, 8.0μ; $(\alpha)_D^{CHCl_3}$ +96°(C=1.00)

*Analysis.*—Calculated for $C_{24}H_{36}O_4$: C, 74.19; H, 9.33. Found: C, 74.15; H, 9.15.

The 3α-acetoxy-16-methyl-16-pregnene-11,20 - dione used as a starting material in Example 1 is prepared by starting with the known 3α-acetoxy-16-pregnene-11,20-dione in accordance with the following procedure:

In a 500 ml. 3-neck flask equipped with condenser, dropping funnel and nitrogen inlet were placed 20 g. of potassium hydroxide in 90 ml. of water, 100 ml. of methanol and 100 ml. of ether. A solution of 10 g. of N-methyl-N-nitrosotosylamide in 50 ml. of ether was placed in the dropping funnel.

Diazomethane was generated by warming the generation flask to 40–45° C. and cautiously adding the N-methyl-N-nitrosotosylamide-ether from the dropping funnel. Nitrogen was utilized to sweep the diazomethane into a solution of 20 g. of 3α-acetoxy-16-pregnene-11,20-dione in 100 ml. of tetrahydrofuran and 120 ml. of ether. The process was continued until the steroid solution remained yellow for several hours. The product, 3α-acetoxy-16α,17α-methyleneazo-pregnane-11,20-dione largely precipitated from the reaction mixture. After 16 hours, the mixture was filtered, washed with ether and dried in air; M.P. 186–190° C. (dec.)

37.4 g. of 3α-acetoxy-16α,17α-methyleneazo-pregnane-11,20-dione was placed in a 500 ml. round-bottom flask and heated by an oil bath in vacuo (pressure 0.6 mm.). A manometer and 12-liter flask were in the line between the flask and pump trap. When the bath temperature reached 180° C., the 3α-acetoxy-16α,17α-methyleneazo-pregnane-11,20-dione began to melt with evolution of nitrogen. The maximum pressure reached was 83 mm. After 10 minutes at 180–182° C., the melt was cooled. It had $$\lambda_{max.}^{CH_3OH}\ 249,\ E\%,\ 191$$

and was taken up in about 150 ml. of acetone, filtered through diatomaceous earth, concentrated to about 100 ml. and ether slowly added to the boiling solution until crystallization occurred. These crystals were 3α-acetoxy-16-methyl-16-pregnene-11,20-dione, M.P. 166–167, $$\lambda_{max.}^{CH_3OH}\ 249,\ Em\ 9300$$

In a similar manner, utilizing diazoethane, 3α-acetoxy-16-ethyl-16-pregnene-11,20-dione and utilizing diazopropane, 3α-acetoxy-16-propyl-16-pregnene-11,20-dione, etc. were prepared.

EXAMPLE 2

*Preparation of 3α-hydroxy-16β-methylpregnane-11,20-dione*

Treatment of 3α-acetoxy-16β-methylpregnane-11,20-dione with methanolic potassium bicarbonate at reflux temperature for 15 minutes gave 3α-hydroxy-16β-methyl-11,20-dione.

EXAMPLE 3

*Preparation of 3α-hydroxy-16β-methyl-17-isopregnane-11,20-dione*

To a solution of 100 mg. of 3α-acetoxy-16β-methylpregnane-11,20-dione (prepared as in Example 1) in 5 ml. of methanol was added 100 mg. of sodium hydroxide in 2 ml. of water. The mixture was refluxed 30 minutes, cooled, and water added. The precipitate of 3α-hydroxy-16-methyl-17-isopregnane-11,20-dione was filtered, washed with water and dried in air. Recrystallization from aqueous-acetone gave pure material.

Similar treatment of 3α-hydroxy-16β-methylpregnane-11,20-dione (prepared as in Example 2) gave the same product, namely, 3α-hydroxy-16β-methyl-17-isopregnane-11,20-dione.

EXAMPLE 4

*Preparation of 3α-acetoxy-16β-methyl-17-isopregnane-11,20-dione*

To 50 mg. of 3α-hydroxy-16β-methyl-17-isopregnane-11,20-dione was added 1 ml. of pyridine and 0.5 mg. acetic anhydride. After 17 hours at 25° C., the mixture was concentrated to dryness in vacuo and the residue crystallized from ether to give 3α-acetoxy-16β-methyl-17-isopregnane-11,20-dione.

EXAMPLE 5

*Preparation of 3α,20-diacetoxy-16β-methyl-17(20)-pregnene-11-one*

To a stirred solution of 1.63 g. of 3α-acetoxy-16β-methyl-pregnane-11,20-dione in 5 ml. of chloroform and 25 ml. of carbon tetrachloride cooled to 0° C. was added a mixture of 2.60 ml. of cold acetic anhydride and 0.13 ml. of 60% perchloric acid.

After 2 hours at 25° C., and 17 hours at 0° C., the mixture was successively washed with cold 5% aqueous sodium carbonate, and cold water and dried over sodium sulfate. The solvents were removed in vacuo leaving a colorless residue of 3α,20-diacetoxy-16β-methyl-17(20)-pregnene-11-one.

I.R. λ max. 5.75–5.85, 8.0μ

Similar treatment of 3α-hydroxy-16β-methylpregnane-11,20-dione, 3α-acetoxy-16β-methyl-17-isopregnane-11,20-dione and 3α-hydroxy-16β-methyl-17-isopregnane-11,20-dione also gave the 3α,20-diacetoxy-16β-methyl-17(20)-pregnene-11-one.

EXAMPLE 6

*Preparation of 3α,20-diacetoxy-16β-methyl-17(20)-oxido-pregnane-11-one*

To 1.86 g. of 3α,20-diacetoxy-16β-methyl-17(20)-pregnene-11-one in 3 ml. of benzene was added 25 ml. of 2.5 M perbenzoic acid in benzene. After 16 hours at 25° uptake of perbenzoic acid was complete. Additional benzene and ether were added and the mixture washed with aqueous sodium sulfite, sodium carbonate solution and water. The organic layer was dried over sodium sulfate and taken to dryness to yield 3α,20-diacetoxy-16β-methyl-17(20)-oxido-pregnane-11-one.

EXAMPLE 7

*Preparation of 3α,17α-dihydroxy-16β-methyl-pregnane-11,20-dione*

To a solution of 1.70 g. of 3α,20-diacetoxy-16β-methyl-17(20)-oxido-pregnane-11-one in 70 ml. of ethanol was added 1.20 g. of sodium hydroxide in 35 ml. of water. After 2 hours at 25° C., 4 ml. of acetic acid was added and the mixture concentrated to a small volume in vacuo. Chloroform and water were added. The chloroform layer was washed with aqueous potassium bicarbonate, saturated with sodium chloride and dried over magnesium sulfate. Removal of the solvents in vacuo and successive crystallization from acetone-ether and benzene-ethyl acetate gave pure 3α,17α-dihydroxy-16β-methylpregnane-11,20-dione M.P. 192–197° C.;

$$\lambda_{max.}^{Nujol}\ 2.90–3.05,\ 5.85–5.90\mu$$

*Analysis.*—Calculated for $C_{22}H_{34}O_4$: C, 72.89; H, 9.45. Found: C, 72.97; H, 9.25.

EXAMPLE 8

*Preparation of 21-bromo-3α,17α-dihydroxy-16β-methylpregnane-11,20-dione*

A solution of 3.50 g. (9.7 millimol) of 3α,17α-dihydroxy-16β-methylpregnane-11,20-dione obtained as above in 40 ml. of chloroform was warmed to 40°–45° C. A solution of 1.76 g. (11 millimol) of bromine in 25 ml. of chloroform was added dropwise to the stirred solution such that the color was not darker than pale yellow (ca. 2 drops/sec., total time—1 hour). The nearly colorless solution was cooled to 20° C. and 200 ml. of ether was added. The mixture was extracted with excess cold 5% potassium bicarbonate solution, sodium bisulfite solution and water and dried over magnesium sulfate. The colorless residue after removal of solvent was 21-bromo-3α,17α-dihydroxy-16β-methylpregnane-11,20-dione.

EXAMPLE 9

*Preparation of 3α,17α,21-trihydroxy-16β-methylpregnane-11,20-dione 21-acetate*

To 4.30 g. of 21-bromo-3α,17α-trihydroxy-16β-methylpregnane-11,20-dione in 90 ml. of acetone and 0.10 ml. of acetic acid were added 4.83 g. of anhydrous potassium acetate and 3.85 g. of potassium iodide. The stirred mixture was refluxed for 18 hours and concentrated on the water pump to a small volume. Water was added, the product extracted into ethyl acetate, and the organic extract dried over magnesium sulfate. The product (4.25 g.) crystallized from acetone-ether to give 3α,17α, 21-trihydroxy-16β-methylpregnane-11,20-dione 21-acetate.

EXAMPLE 10

*Preparation of 17α,21-dihydroxy-16β-methyl-pregnane-3,11,20-trione 21-acetate*

To 3α,17α,21 - trihydroxy-16β-methylpregnane - 11,20-dione 21-acetate, 4.0 g., in 100 ml. t-butanol and 20 ml. of water cooled to 10°–15° C., was added 3.5 g. N-bromosuccinimide. The suspension was stirred at 15° C. until all the N-bromosuccinimide had dissolved (90 minutes). The reaction mixture was kept at 2° C. for about sixteen hours and at 25° C. for 2 hours. Sodium sulfite solution was added to destroy bromine and the mixture concentrated on the water pump to a low volume. A granular precipitate had formed; water was added, the precipitate filtered, washed with water to give 17α,21-dihydroxy-16β-methylpregnane-3,11-20-trione 21-acetate purified by crystallization from acetone-ether.

EXAMPLE 11

*Preparation of 4-bromo-17α,21-dihydroxy-16β-methylpregnane-3,11,20-trione 21-acetate*

To a stirred solution of 585 mg. of 17α,21-dihydroxy-16β-methylpregnane-3,11,20-trione 21-acetate in 10 ml. of acetic acid and 8 ml. of chloroform kept at −10° C. was added slowly 230 mg. of bromine in 6 ml. of chloroform. After addition was complete, 1.2 g. of sodium acetate in 7 ml. of cold water was added. Additional water was added, and the mixture was extracted with chloroform. The chloroform extract was washed with dilute potassium bicarbonate, water and dried over sodium sulfate. The residue was triturated with ether to give 480 mg. of crystalline 4-bromo-17α,21-dihydroxy-16β-methylpregnane-3,11,20-trione 21-acetate M.P. 165–170° C. dec.

*Analysis.*—Calculated for $C_{24}H_{33}O_6Br$: Br, 16.08. Found: Br, 15.58.

A second crop of 133 mg. of 4-bromo-17α,21-dihydroxy-16β-methylpregnane-3,11,20-trione 21-acetate was also obtained.

EXAMPLE 12

*Preparation of the 3-semicarbazone of 17α-21-dihydroxy-16β-methyl-4-pregnene-3,11,20-trione 21-acetate*

To 583 mg. of 4-bromo-17α,21-dihydroxy-16β-methyl-pregnane-3,11,20-trione 21-acetate in 20 ml. of acetonitrile under nitrogen was added a slurry of 600 mg. of semicarbazide hydrochloride and 410 mg. sodium bicarbonate in 4 ml. of water. After 2 hours, the acetonitrile was removed in vacuo, water added and 540 mg. of crystalline 3-semicarbazone of 17α,21-dihydroxy-16β-methyl-4-pregnene-3,11,20-trione 21-acetate filtered, washed with water and dried.

EXAMPLE 13

*Preparation of 17α,21-dihydroxy-16β-methyl-4-pregnene-3,11,20-trione 21-acetate*

540 mg. of the semicarbazone of 17α,21-dihydroxy-16β-methyl-4-pregnene-3,11,20-trione 21-acetate was dissolved in 20 ml. of acetic acid, 1.5 ml. of pyruvic acid and 5 ml. of water. After 18 hours at 25° C., water was added and the mixture extracted with chloroform. The chloroform extract was washed with aqueous potassium bicarbonate, water and dried over sodium sulfate. Removal of solvent gave crude 17α,21-dihydroxy-16β-methyl-4-pregnene - 3,11,20 - trione 21-acetate which was purified by chromatography on neutral alumina and crystallization from acetone-ether (hexagonal plates). The pure material had M.P. 226°–232° C.

$\lambda_{max.}^{CH_3OH}$ 238 mμ E=15,600; $\lambda_{max.}^{CHCl_3}$ 2.85–2.98, 5.73, 5.79, 5.85, 6.00, 6.18μ; $[\alpha]_D^{CHCl_3}$ +252 (C=.640°)

*Analysis.*—Calculated for $C_{24}H_{32}O_6$: C, 69.21; H, 7.75. Found: C, 69.24; H, 7.58.

It should be understood that various changes may be made in the present process as herein described without affecting the results attained. Thus, various modifications of conditions as to time, temperature, etc. and various changes in procedure differing from those herein given as illustrative of the preferred embodiments of this invention may be made without departing from the scope thereof. Accordingly, the scope of the invention is to be determined in accordance with the prior art and the appended claims.

What is claimed is:

1. 3α,20 - diacetoxy-16β-lower alkyl-17(20)-pregnene-11-one.

2. 3α,20-diacetoxy-16β - methyl - 17(20)-pregnene-11-one.

3. 3α,20-diacetoxy-16β-lower alkyl-17(20)-oxido-pregnane-11-one.

4. 3α,20 - diacetoxy - 16β - methyl-17(20)-oxido-pregnane-11-one.

References Cited in the file of this patent

UNITED STATES PATENTS

| | | |
|---|---|---|
| 2,701,808 | Hogg et al. | Feb. 8, 1955 |
| 2,751,398 | Hunt et al. | June 19, 1956 |
| 2,786,856 | Cutler et al. | Mar. 26, 1957 |
| 2,790,799 | Djerassi et al. | Apr. 30, 1957 |
| 2,797,230 | Nicholls | June 25, 1957 |

OTHER REFERENCES

Fieser and Fieser: Natural Products Related to Phenanthrene, 3rd edition (1949), pages 390–92; 456–7.